United States Patent
Grenet

(10) Patent No.: US 11,412,142 B2
(45) Date of Patent: Aug. 9, 2022

(54) TRANSLATION CORRECTION FOR OPTICAL IMAGE STABILIZATION

(71) Applicant: InvenSense, Inc., San Jose, CA (US)

(72) Inventor: Pierre Grenet, Grenoble (FR)

(73) Assignee: InvenSense, Inc., San Jose, CA (US)

( * ) Notice: Subject to any disclaimer, the term of this patent is extended or adjusted under 35 U.S.C. 154(b) by 247 days.

(21) Appl. No.: 16/751,908

(22) Filed: Jan. 24, 2020

(65) Prior Publication Data

US 2020/0288060 A1 Sep. 10, 2020

Related U.S. Application Data

(60) Provisional application No. 62/815,326, filed on Mar. 7, 2019.

(51) Int. Cl.
| | |
|---|---|
| H04N 5/232 | (2006.01) |
| G06T 7/80 | (2017.01) |
| G06T 7/20 | (2017.01) |

(52) U.S. Cl.
CPC .......... *H04N 5/23287* (2013.01); *G06T 7/20* (2013.01); *G06T 7/80* (2017.01); *H04N 5/2327* (2013.01); *H04N 5/23254* (2013.01); *H04N 5/23258* (2013.01); *H04N 5/23267* (2013.01); *G06T 2207/30244* (2013.01)

(58) Field of Classification Search
CPC .......... H04N 5/23287; H04N 5/23254; H04N 5/23258; H04N 5/23267; H04N 5/2327; G06T 7/80; G06T 7/20; G06T 2207/30244
See application file for complete search history.

(56) References Cited

U.S. PATENT DOCUMENTS

| | | | |
|---|---|---|---|
| 7,104,129 B2 | 9/2006 | Nasiri et al. | |
| 8,250,921 B2 | 8/2012 | Nasiri et al. | |
| 8,952,832 B2 | 2/2015 | Nasiri et al. | |
| 2010/0074605 A1* | 3/2010 | Washisu | G03B 5/00 396/53 |
| 2012/0093493 A1 | 4/2012 | Wakamatsu | |
| 2012/0113280 A1 | 5/2012 | Stupak et al. | |
| 2015/0321903 A1 | 11/2015 | Lloyd et al. | |
| 2018/0220073 A1 | 8/2018 | Keal | |
| 2019/0220073 A1* | 7/2019 | Wu | H05K 7/1492 |
| 2019/0222767 A1* | 7/2019 | Imanishi | H04N 5/23258 |
| 2020/0120282 A1* | 4/2020 | Guo | H04N 5/23267 |
| 2020/0288061 A1 | 9/2020 | Grenet et al. | |

* cited by examiner

*Primary Examiner* — Nicholas G Giles
(74) *Attorney, Agent, or Firm* — DLA Piper LLP (US)

(57) ABSTRACT

Systems and methods of optically stabilizing an image. A lens obtains optical image information corresponding to an image. An image sensor converts the optical image information into electrical image information. A rotation signal related to rotational movement of a camera unit is generated using a first motion sensor that provides a signal related to rotation when the camera unit is rotated. A translation signal related to translational movement of the camera unit is generated using a second motion sensor that provides a signal related to translation when the camera unit undergoes translational movement. The translation signal is modified using the rotation signal to generate a corrected translation signal that compensates for lens movement which is different from second motion sensor movement. The corrected translation signal controls an actuator that adjusts a lens position with respect to the image sensor, based on rotation and translation experienced by the camera unit.

22 Claims, 8 Drawing Sheets

TRANSLATION CORRECTION FOR OPTICAL IMAGE STABILIZATION

CROSS REFERENCE TO RELATED APPLICATIONS

This application claims priority to Provisional Application Ser. No. 62/815,326 filed on Mar. 7, 2019, which is hereby incorporated by reference in its entirety.

FIELD OF THE INVENTION

The present invention generally relates to the field of imaging systems and methods, and more specifically, to imaging systems and methods having the ability to correct for movement of the imaging system during an image capture event.

BACKGROUND OF THE INVENTION

Imaging systems, such as still image cameras or video cameras, are commonly used to capture either a fixed (i.e., still) image or a series of images that make up a video sequence. With recent advances in technology and manufacturing, such cameras have been made smaller and cheaper. Additionally, the proliferation of electronic digital technology in recent years and decades, coupled with the continuing decrease in the cost of such digital technology and the cost of electronic memory, has resulted in widespread adoption and incorporation of digital cameras into various electronic devices. For example, video surveillance cameras for security and other applications typically incorporate digital cameras. Such cameras tend to be fixed in a particular position or orientation, and therefore, do not suffer from any imaging problems which may occur if the camera is shifted—even slightly—during the short period that each image is being captured.

In addition to being standalone devices, cameras—and in particular, digital cameras—have become common components or subsystems in many portable electronic devices. Foremost among these portable devices incorporating digital cameras are mobile or cellular telephones. In recent years, such mobile phones have developed to even include multiple cameras, oftentimes with one or more cameras on each "face" or side of the mobile phone, such that there are cameras pointing 180 degrees opposite each other to thereby capture images located on either or opposite sides of the mobile phone. The existence of a microprocessor, memory, housing and other components already needed to implement the various other features of the mobile phone, has resulted in a fairly small incremental cost for adding such camera functionality to the mobile phones.

Since the mobile phone is intended primarily as a handheld device, a problem begins to arise when the onboard camera of the mobile phone is used to capture an image while the mobile device is held in the user's hand. Despite a user's best intentions and efforts, virtually all users are unable to maintain their hand in a steady, fixed position while the image is being captured. Human users typically exhibit a slight hand movement or jitter, which is a physiological phenomenon causing the user's hand to shake or move at a relatively low frequency—typically at a frequency below 20 Hz. As mobile phones become lighter, the problem of jitter increases, since it is more difficult to hold steady a relatively lighter object.

The undesired result of such movement when using a camera is the introduction of picture blurring. Fundamentally, this is due to the fact that the focusing lens within the camera positioned in the mobile phone is moving ever so slightly (user jitter) with respect to the fixed image being captured. An additional source of error in the image capture may also be due to misalignment in the optical path between the lens and the image sensor within the phone onto which the lens focuses the image. This results in a smearing or blurring of the image, since there has now been introduced a relative movement between the object being imaged, the camera lens trying to focus the image, and the image sensor onto which the image is being focused, during the period of time or exposure that the camera lens is viewing the object or target. In addition, as camera quality increases and the number of pixels per image increases, the undesired effects of jitter become more noticeable, since a greater number of pixels may be affected.

One approach to addressing the undesired effects of jitter is the use of optical image stabilization (OIS). Broadly speaking, in optical image stabilization, a sensor is used to sense the jitter or movement of the camera, or device containing the camera, and an attempt is made to compensate for those unintended and unwanted movements. One advantage of optical image stabilization is that it offers the capability to use longer aperture times, and thus, the ability to take better pictures under low light conditions without having to use a flash, and therefore, losing background information. Optical image stabilization is usually not effective to compensate for gross movements or large scale movement, but rather only small scale movements of a user's hand on the order of a few degrees of motion/rotation or a few millimeters of translation motion. One disadvantage of optical image stabilization is that additional hardware, such as sensors and the like, are required to be added, resulting in increased cost, weight, and size of the various mobile phones.

An alternative approach which has been developed to address jitter and hand movement in such applications, is electronic or digital image stabilization. A relative advantage of electronic image stabilization over optical image stabilization is that the former usually does not require the addition of new components. Instead, the approach of electronic image stabilization is to utilize complex algorithms and computations to analyze pixel and frame information and interpolate across an image or in between successive images to thereby "smooth out" any undesired changes. A relative disadvantage of this approach is the need for greater computational resources, as well as memory.

User movement when holding a camera can cause a misalignment between the focusing lens and the image sensor, as discussed above. In such a situation, the lens movement relative to the image may be different than the relative movement between the image sensor and the image since the lens and the image sensor are located at different positions within the mobile phone.

Optical image stabilization may be used to reposition the lens and/or the imaging sensor. Specifically, using the lens shift method, only the lens is moved using, for example, a small controlled motor or actuator, in order to realign the optical path to provide the image onto the correct, expected position with respect to the imaging sensor. Alternatively, the entire camera module (lens and sensor) may be moved in order to realign optically with the image being viewed.

An optical image stabilization system is used to detect vibration, control the camera components and thereby compensate for unwanted or unintended camera movement. The vibrations are typically sensed in two axes, i.e., the pitch direction (tilting down or up) and the yaw direction (tilting to the right or to the left). Different types of sensors may be used to detect motion depending on the particular implementation. Such sensors may be Hall effect sensors, photoreflectors, gyroscopes, and the like. The sensor information is used as input to calculate a desired shift of the lens and/or image sensors, and this desired shift may be carried out by actuators and the like to move the lens and/or image sensors. The goal is to realign the optical path to the center of the image sensor.

Conventional optical image stabilization systems suffer from the fact that they are usually limited to compensation for rotation movement along 2-axes of movement, the pitch axis and the yaw axis. Although up to three rotational axes may be taken into consideration, the roll-axis is normally not compensated. Thus, such systems do not address non-rotation motion, i.e., vibration or unintended motion which is not of the form of rotation, but rather in the form of translational movement. For improved accuracy of optical image stabilization systems, there is a need for correction of lateral motion and vibration, along two or more axes, in addition to the compensation for rotational movement.

SUMMARY OF THE INVENTION

In embodiments, the present invention is directed to an optical image stabilization system and method which also compensate for translation, in addition to rotation compensation which is included in conventional compensation techniques. This translation compensation may be performed for one, two or three axes, but is typically performed for two axes. The resulting compensation is typically referred to as four axis compensation—two axes rotation and two axes translation.

According to the present invention, a gyroscopic sensor is used to detect the angular velocity of the camera, or the angular velocity of the device within which the camera is positioned, such as a mobile telephone. From the angular velocity, the rotation of the device can be determined, such as for example, by integration. The gyroscopic sensor may be a two-dimensional sensor which provides angular velocity information along each of two different axes or dimensions. In this way, using the angular velocity information for each axis or dimension, a compensation or stabilization may be achieved in each of the two axes or dimensions based on a rotation movement of the camera or the camera-containing device.

Additionally, an accelerometer may be used to detect acceleration movement of the camera or the camera-containing device. This acceleration information may be used to determine translation movement of the camera or the camera-containing device. For example, a double integration of the acceleration information may be carried out to determine translation, or change in position. A two axis or two dimension accelerometer may be used to provide acceleration information along each of two different axes or dimensions. In this way, using the acceleration information for each axis or dimension, a compensation or stabilization may be achieved in each of the two axes or dimensions based on a translation movement of the camera or the camera-containing device.

In certain embodiments according to the present invention, the sensors used for the optical image stabilization may not be dedicated sensors for this purpose, but instead may be sensors located on a main circuit board of the mobile phone or camera-carrying device. The significance of this is that since such sensors may be located physically distant from the lens, then the translation information indicated by the sensors will be the translation experienced at the sensors, not necessarily the translation experienced by the lens, since the translation experienced by the board containing the sensors and the translation experienced by the lens may be different due to the physical separation between the two. In other words, the translation at the sensor may be different than the translation at the lens. To address this issue, a correction is applied to the sensor translation which takes into account the relative position between the sensor and the lens. This results in a corrected translation estimation which is more representative of the real translation at the lens.

The two axis rotation information and the two axis translation information may be utilized to determine an appropriate compensation in each of the axes or dimensions in order to compensate or correct for unwanted movement or positioning of the camera lens. This compensation information may be provided as input to control a motor or actuator which acts to move either the lens or the image sensor in order to control the optical path between the target (i.e., image) and the image sensor. In this way, the optical image stabilization system insures that the light arriving at the image sensor has not deviated from the expected trajectory, and also, no additional post processing algorithms or computations need to be performed on each frame of image data.

The compensation or stabilization process may be carried out continuously, or nearly continuously, as a function of time while the camera is active. In this way, the optical image stabilization system of the invention can detect and react to any camera movement while the camera is active.

In some embodiments, the present invention is directed to an optical image stabilization system and method which also compensate for translation, in addition to rotation compensation. This translation compensation may be performed for one, two or three axes. A gyroscopic sensor may be used to detect the angular velocity of the camera and from the angular velocity, the rotation of the device can be determined, such as for example, by integration. This rotation may be determined for one or more axes. An accelerometer may be used to detect acceleration movement of the camera which may be used to determine translation movement of the camera. A two axis or two dimension accelerometer may be used to provide acceleration information along each of two different axes or dimensions. In this way, using the acceleration information for each axis or dimension, a compensation or stabilization may be achieved in each of the two axes or dimensions based on a translation movement of the camera or the camera-containing device.

BRIEF DESCRIPTION OF THE DRAWINGS

The above and still further objects, aims, features, aspects and attendant advantages of the present invention will become clear to those of ordinary skill in the art from a consideration of the following detailed description of embodiments presently contemplated for carrying out the principles of the invention, including alternative embodiments and implementations, taken in conjunction with the accompanying figures, in which.

DETAILED DESCRIPTION OF ILLUSTRATIVE EMBODIMENTS

Figure 1:
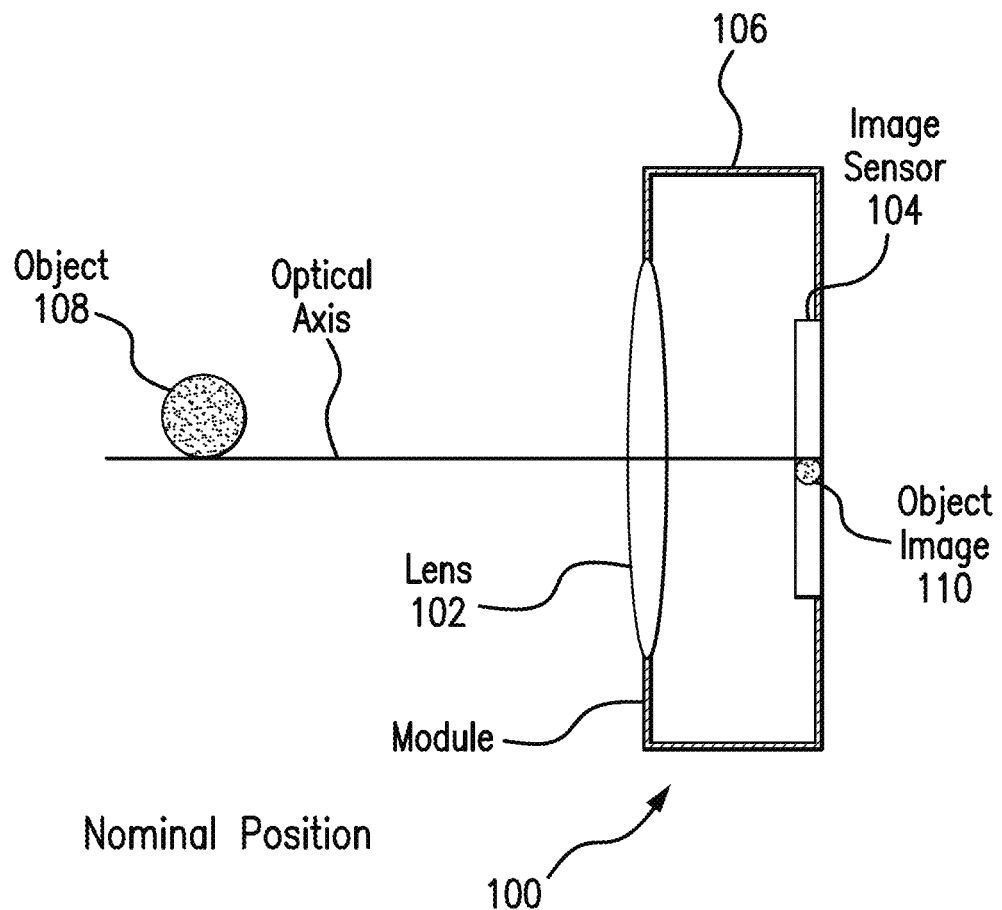
FIG. 1 is an illustration of a lens and image portion of a camera when in the normal position.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), sensor processing units (SPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU/SPU and a microprocessor, a plurality of microprocessors, one or more microprocessors in conjunction with an MPU/SPU core, or any other such configuration.

As noted above, it is increasingly desirable to provide a mobile electronic device with one or more digital cameras. Correspondingly, it is also desirable to provide OIS systems to improve the image quality produced by such cameras. Conventionally, an OIS module may comprise motion sensors, such as gyroscopes and accelerometers, dedicated for the OIS. This disclosure is directed to reducing the costs and complexities associated with conventional OIS implementations. In particular, one or more functions associated with OIS may be performed by hardware and/or processing resources that are provided independently of a camera unit. For example, a mobile device may have a gyroscope and/or other suitable motion sensor that performs functions unrelated to OIS. Notably, a mobile device may employ motion sensors as part of the user interface, such as for determining orientation of the device to adjust the display of information accordingly as well as for receiving user input for controlling an application, for navigational purposes, or for a wide variety of other applications. Data from such a sensor may be used to determine motion of the mobile device for OIS so that the camera unit does not require a dedicated motion sensor. As will be appreciated, the user interface functions may not be required during image recording or the motion sensor may be able to perform both functions (as well as others) simultaneously. Further, a processor or processing resources utilized for other functions in the mobile device, such as processing the sensor data, may be employed to perform tasks associated with OIS, reducing or removing the need to provide dedicated OIS processing on the camera unit. Such architecture designs allow for a simplified camera unit, as well as facilitating manufacture and calibration.

In describing certain embodiments of the invention illustrated in the drawings, certain specific terminology will be used for the sake of clarity and explanation. However, the invention is not intended to be limited to the particular specific terminology, and it is to be understood that the terminology used herein includes all equivalents that operate in a similar manner to accomplish the same or similar result.

Referring now to FIG. 1, therein is illustrated a relevant portion of a camera assembly 100 including a lens 102, image sensor 104, and housing 106. In FIG. 1, the camera assembly 100 is not moving with respect to the object 108 being viewed. As a result, the image 110 of the object 108 is properly positioned on the image sensor 104 after passing through lens 102. It should be noted that the object image 110 is essentially "upside down" as it appears on the image sensor 104, but this is due to the optical behavior of lens 102 as is commonly known and understood in conventional optics. The lens 102 is used to obtain and focus optical information corresponding to the image onto the image sensor 104, which in turn converts the optical image information into electrical image information for subsequent storage, display, or the like, as is conventionally known.

Figure 2:
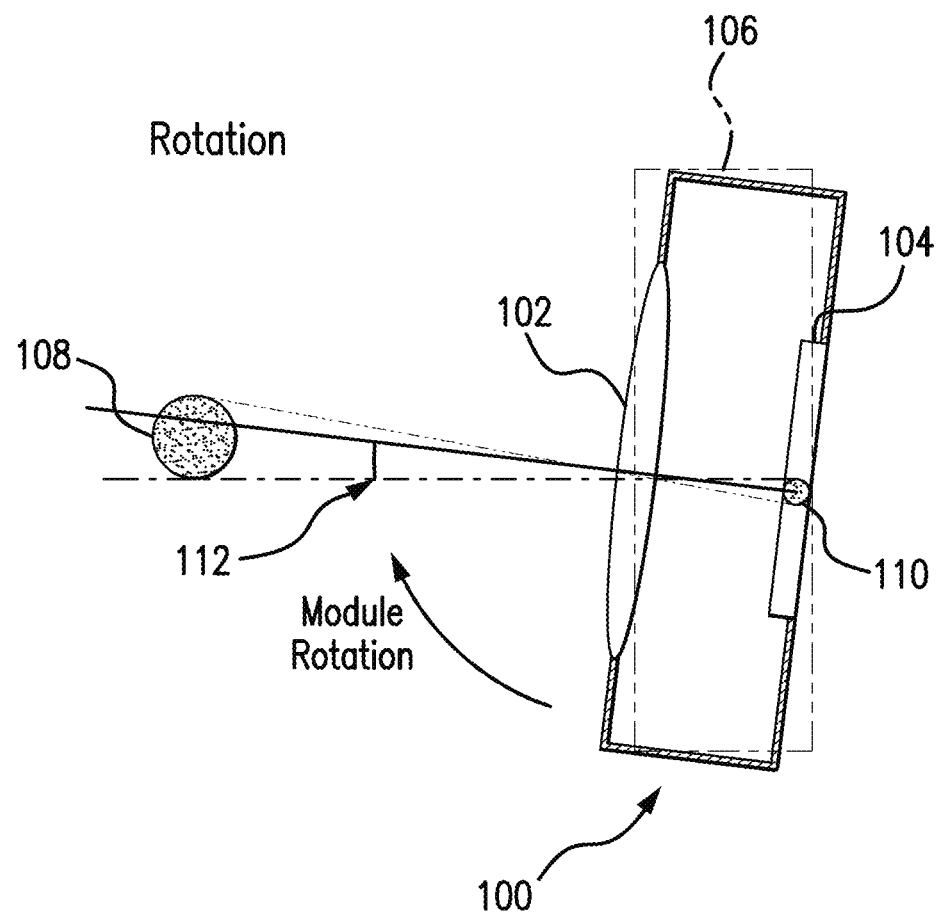
FIG. 2 is an illustration of a lens and image portion of a camera when the camera is in a rotated position.

FIG. 2 illustrates the camera assembly 100 in a position where it has undergone a small clock-wise rotation 112 with respect to the object 108. The rotation is essentially a tilt or angular movement about an axis of the camera assembly 100. As a result, the image 110 of the object 108 will effectively shift on the sensor 104 by an amount based on the amount of rotation. The effect of this will be that the object 108 will appear to have moved, and when this "movement" takes place during the exposure time during which the sensor 104 is used to image the object 108, then the image 110 recorded by the sensor 104 will appear to have been stretched, or blurred. When this movement takes place during video recording, the object 108 seems to have moved, while in factor the object 108 did not move. FIG. 2 illustrates a rotation about one axis, but the effect is essentially the same when the rotation is about another of the camera's axes which is orthogonal to the one illustrated in FIG. 2.

Figure 3:
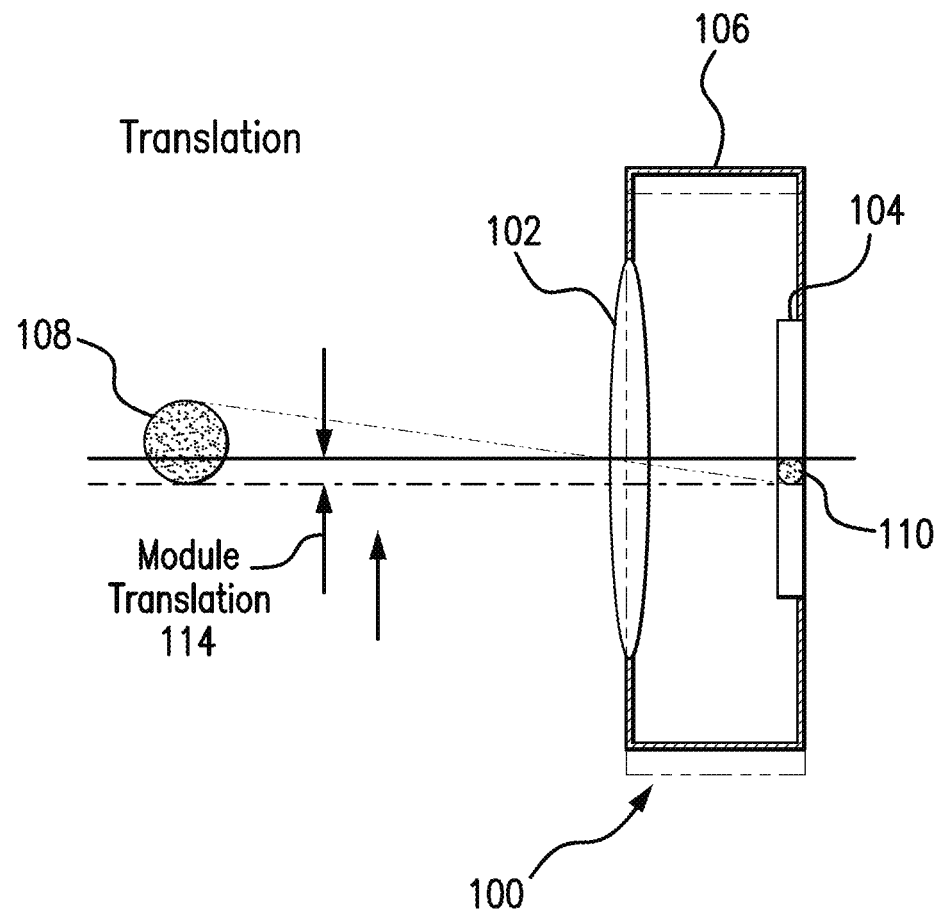
FIG. 3 is an illustration of a lens and image portion of a camera when the camera is in a translated position.

FIG. 3 illustrates the camera assembly 100 in a position where it has undergone a translation 114 with respect to the object 108. The translation is essentially a linear movement along one axis or dimension of the camera assembly 100. As a result, the image 110 of the object 108 will be effectively shifted with respect to the image sensor 104. As with the rotation effect discussed above, the effect of this will be that the object 108 will appear to have moved, and when this "movement" takes place during the exposure time during which the image sensor 104 is used to image the object 108, then the image 110 recorded by the image sensor 104 will appear to have been stretched, or blurred. FIG. 3 illustrates a translation along one axis, but the effect is essentially the same when the translation is along another of the camera's axes which is orthogonal to the one illustrated in FIG. 3. In addition, when there is translation movement along multiple axes, the net translation movement of the assembly 100 may appear to be in a diagonal direction, but the diagonal movement is simply made up of individual linear translations, each one along one of the multiple axes or dimensions.

Figure 4:
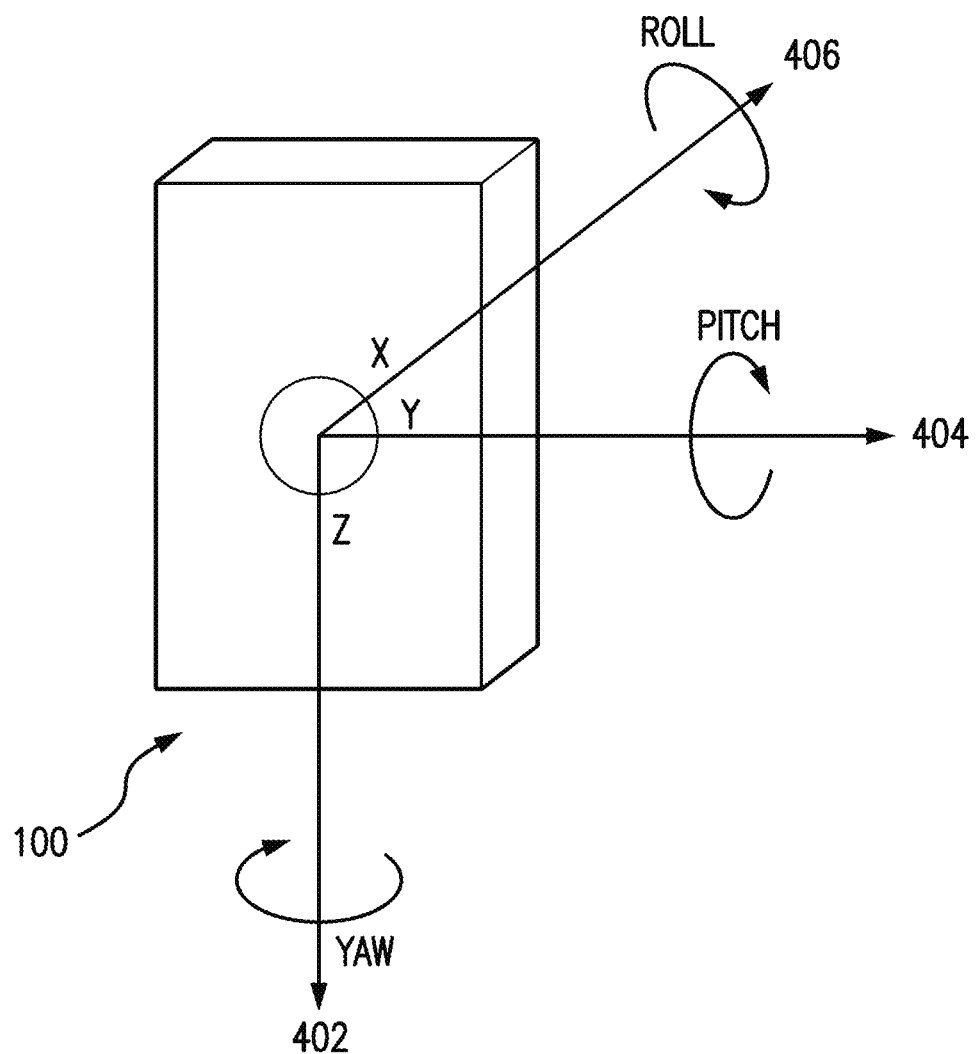
FIG. 4 is a perspective view of the different axes of rotation with respect to an object.

FIG. 4 illustrates the camera assembly 100 and indicates the three different axes or dimensions for reference purposes in connection with describing rotation movement. The three axes, 402, 404, and 406 are each orthogonal to each other. Rotation about axis 402 is referred to as yaw, rotation about axis 404 is referred to as pitch, and rotation about axis 406 is referred to as roll. In an x-y-z frame of reference, the x-axis may correspond to roll, the y-axis may correspond to pitch, and the z-axis may correspond to yaw.

Figure 5:
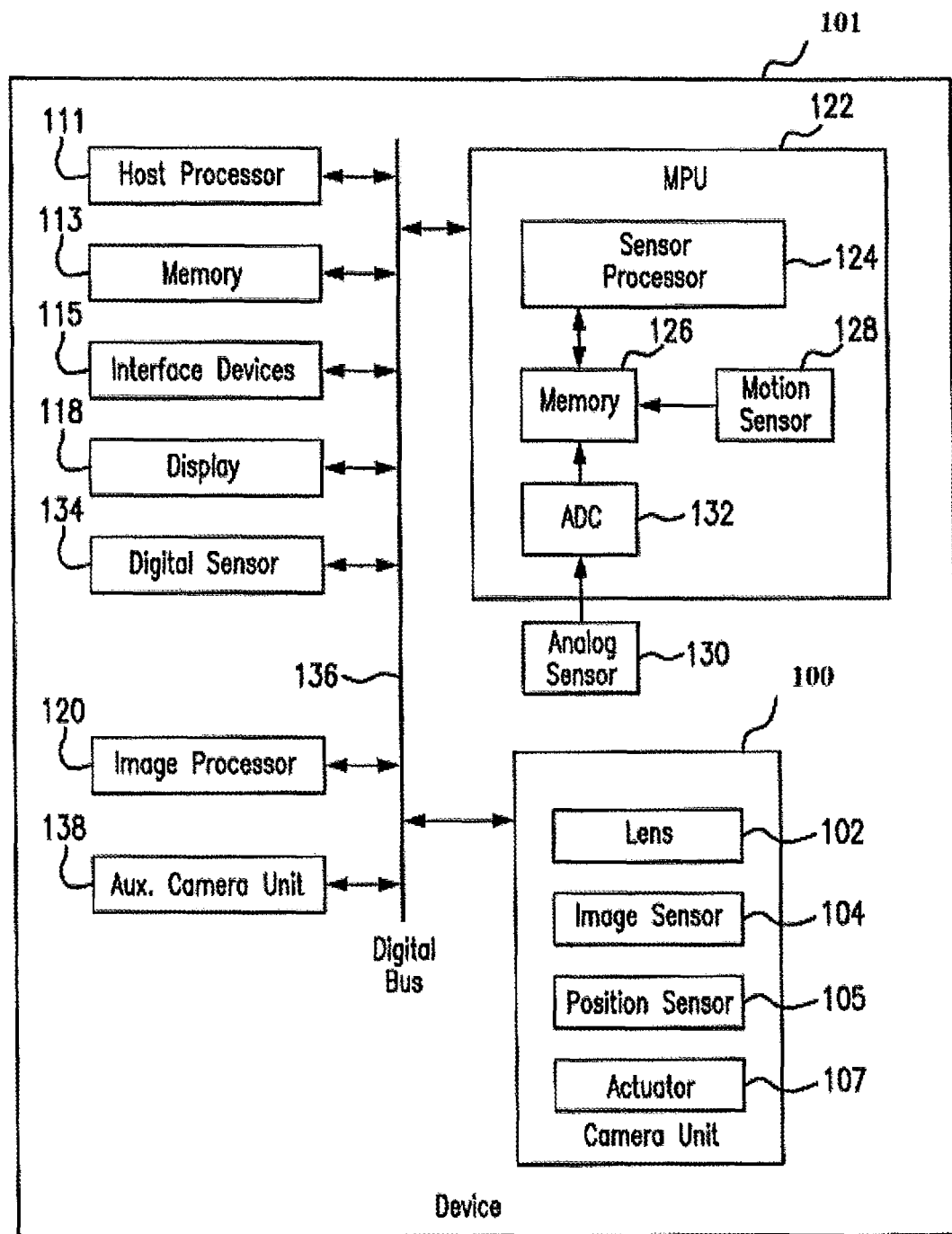
FIG. 5 is a block diagram of an optical image stabilization system according to an embodiment of the present invention.

FIG. 5 shows a block diagram of an optical image stabilization system according to an embodiment of the present invention. As shown in FIG. 5, the optical image stabilization system may be included as part of a handheld device or a device 101 that is secured to a user. Such a device may be a smartphone, tablet, laptop, personal digital assistant (PDA), video game player, video game controller, navigation device, mobile internet device (MID), personal navigation device (PND), portable music, video, or media player, remote control, or other handheld device, or a combination of one or more of these devices.

As shown, camera unit 100 includes lens 102, image sensor 104, actuator 107 for imparting relative movement between lens 102 and image sensor 104 along at least two orthogonal axes, and position sensor 105 for determining the position of lens 102 in relation to image sensor 104. In one aspect, actuator 107 may be implemented using voice coil motors (VCM) and position sensor 105 may be implemented with Hall sensors, although other suitable alternatives may be employed. The handheld device may also include a host processor 111, memory 113, interface devices 115 and display 118. Host processor 111 can be one or more microprocessors, central processing units (CPUs), or other processors which run software programs, which may be stored in memory 113, associated with the functions of the handheld device. Interface devices 115 can be any of a variety of different devices providing input and/or output to a user, such as audio speakers, buttons, touch screen, joystick, slider, knob, printer, scanner, computer network I/O device, other connected peripherals and the like. Display 118 may be configured to output images viewable by the user and may function as a viewfinder for camera unit 100. Further, the embodiment shown features dedicated image processor 120 for receiving output from image sensor 104, although in other embodiments this functionality may be performed by host processor 111 or other processing resources.

Accordingly, multiple layers of software can be provided in memory 113, which may be any combination of computer readable medium such as electronic memory or other storage medium such as hard disk, optical disk, etc., for use with the host processor 111. For example, an operating system layer can be provided for the handheld device to control and manage system resources in real time, enable functions of application software and other layers, and interface application programs with other software and functions of the handheld device. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single handheld device, and in some of those embodiments, multiple applications can run simultaneously.

The handheld device also includes integrated motion processing unit (MPU.™) 122 featuring sensor processor 124, memory 126 and motion sensor 128. Memory 126 may store algorithms, routines or other instructions for processing data output by motion sensor 128 and/or other sensors as described below using logic or controllers of sensor processor 124, as well as storing raw data and/or motion data output by motion sensor 128 or other sensors. Motion sensor 128 may be one or more sensors for measuring motion of the handheld device in space. Depending on the configuration, MPU 122 measures one or more axes of rotation and/or one or more axes of acceleration of the device. In one embodiment, at least some of the motion sensors are inertial sensors, such as rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 124 or other processing resources of the handheld device provides a six axis determination of motion. As desired, motion sensor 128 may be implemented using MEMS to be integrated with MPU 122 in a single package. Exemplary details regarding suitable configurations of host processor 111 and MPU 122 may be found in U.S. Pat. Nos. 8,250,921 and 8,952,832, which are hereby incorporated by reference in their entirety. Further, MPU 122 may be configured as a sensor hub by aggregating sensor data from additional processing layers as described in U.S. Patent Publication No. 2015/0321903, which is also hereby incorporated by reference in its entirety. Suitable implementations for MPU 122 in the handheld device are available from InvenSense, Inc. of Sunnyvale, Calif. Thus, MPU 122 is configured to provide motion data for purposes independent of camera unit 100, such as to host processor 111 for user interface functions, as well as enabling OIS functionality.

The handheld device may also include other sensors as desired. As shown, analog sensor 130 may provide output to analog to digital converter (ADC) 132 within MPU 122. Alternatively or in addition, data output by digital sensor 134 may be communicated over digital bus 136 to sensor processor 124 or other processing resources in the handheld device. Analog sensor 130 and digital sensor 134 may provide additional sensor data about the environment surrounding the handheld device. For example, sensors such as one or more pressure sensors, magnetometers, temperature sensors, infrared sensors, ultrasonic sensors, radio frequency sensors, or other types of sensors can be provided. In one embodiment, data from a magnetometer measuring along three orthogonal axes may be combined with gyroscope and accelerometer data to provide a nine axis determination of motion. Further, a pressure sensor may be used as an indication of altitude for the handheld device, such that a sensor fusion operation may provide a ten axis determination of motion. In the context of the OIS techniques of this disclosure, any combination of sensors, including motion sensor 128, analog sensor 130 and digital sensor 134, all of which may be implemented independently of camera unit 100, may be used to determine angular velocity of the handheld device along the two orthogonal axes associated with the plane of image sensor 104.

In the embodiment shown, camera unit 100, MPU 122, host processor 111, memory 113 and other components of the handheld device may be coupled through digital bus 136, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of the handheld device, such as by using a dedicated bus between host processor 111 and memory 113.

As noted above, multiple layers of software may be employed as desired and stored in any combination of memory 113, memory 126, or other suitable location. For example, a motion algorithm layer can provide motion algorithms that provide lower-level processing for raw sensor data provided from the motion sensors and other sensors. A sensor device driver layer may provide a software interface to the hardware sensors of the handheld device. Further, a suitable application program interface (API) may be provided to facilitate communication between host processor 111 and MPU 122, for example, to transmit desired sensor processing tasks. Other embodiments may feature any desired division of processing between MPU 122 and host processor 111 as appropriate for the applications and/or hardware being employed. For example, lower level software layers may be provided in MPU 122 and an API layer implemented by host processor 111 may allow communication of the states of application programs as well as sensor commands. Some embodiments of API implementations in a motion detecting device are described in U.S. Pat. No. 8,952,832, incorporated by reference above.

Additionally, the handheld device may include a plurality of digital imaging modules, each of which may implement OIS utilizing general purpose motion sensing and/or processing capabilities according to the techniques of this disclosure. For example, handheld device may include auxiliary camera unit 138. Although not shown for the purposes of clarity, one of skill in the art will appreciate that auxiliary camera unit 138 may include sufficient assemblies for OIS, such as actuators, position sensors and the like as described in the context of camera unit 100 or the other camera units of this disclosure. In one embodiment, handheld device may be a smartphone, in which case camera unit 100 may be configured as a rear-facing camera and auxiliary camera unit 138 may be configured as a front-facing camera. In other embodiments, any suitable number of camera units may utilize the motion sensing capabilities of the handheld device to implement OIS.

In the described embodiments, a chip is defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. MEMS cap provides mechanical support for the MEMS structure. The MEMS structural layer is attached to the MEMS cap. The MEMS cap is also referred to as handle substrate or handle wafer. In the described embodiments, an MPU may incorporate the sensor. The sensor or sensors may be formed on a first substrate. Other embodiments may include solid-state sensors or any other type of sensors. The electronic circuits in the MPU receive measurement outputs from the one or more sensors. In some embodiments, the electronic circuits process the sensor data. The electronic circuits may be implemented on a second silicon substrate. In some embodiments, the first substrate may be vertically stacked, attached and electrically connected to the second substrate in a single semiconductor chip, while in other embodiments the first substrate may be disposed laterally and electrically connected to the second substrate in a single semiconductor package.

As one example, the first substrate may be attached to the second substrate through wafer bonding, as described in U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

In the described embodiments, raw data refers to measurement outputs from the sensors which are not yet processed. Depending on the context, motion data may refer to processed raw data, which may involve applying a sensor fusion algorithm or applying any other algorithm. In the case of a sensor fusion algorithm, data from one or more sensors may be combined to provide an orientation of the device. In the described embodiments, an MPU may include processors, memory, control logic and sensors among structures.

Figure 6:
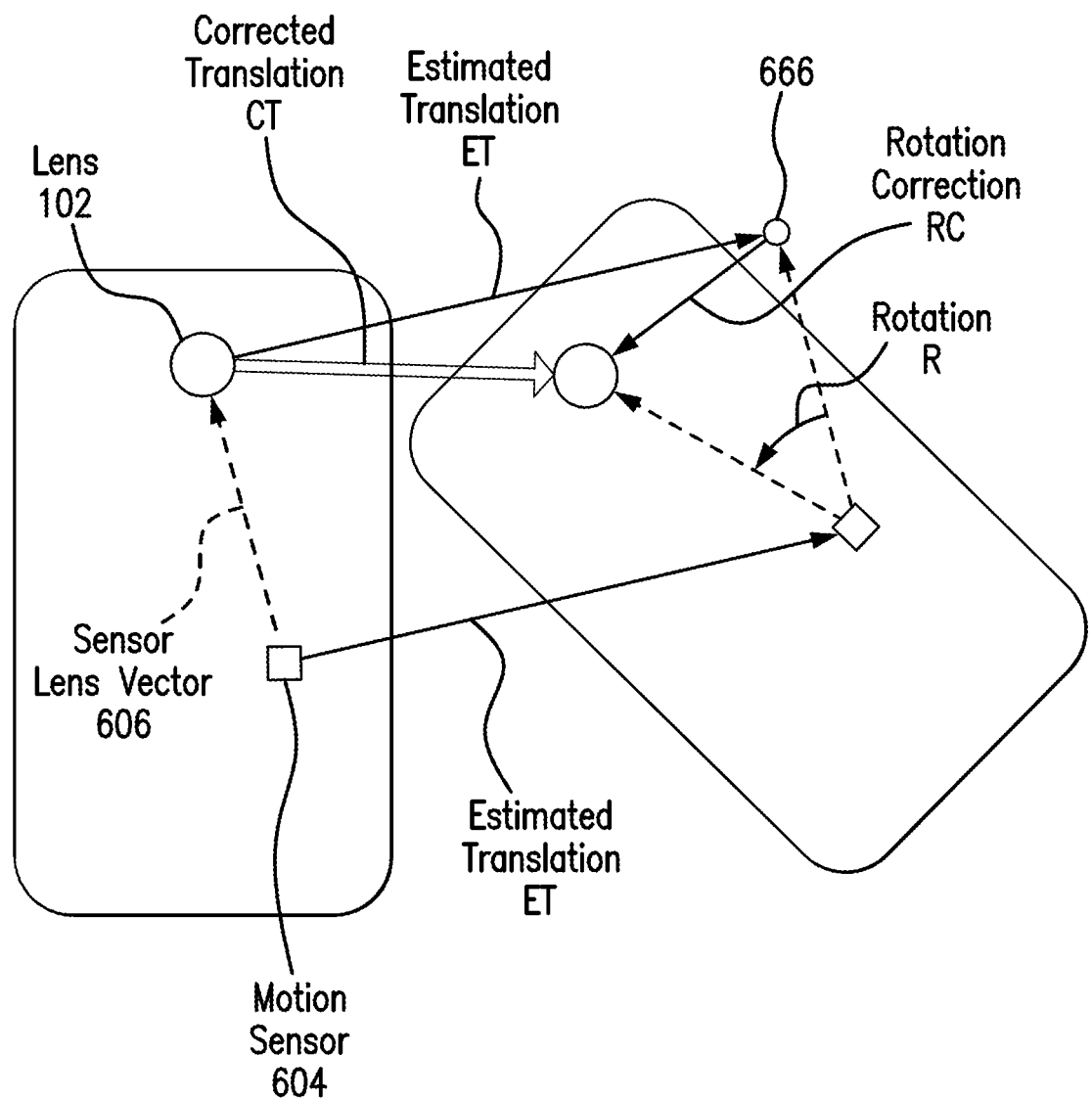
FIG. 6 is an illustration of a device incorporating a camera which has undergone both rotation and translation.

FIG. 6 illustrates the camera assembly 100 in a starting position, as well as in a rotated and translated position 600. Note that the motion of camera assembly 100 is exaggerated for the purpose of explaining the invention, and the actual amplitude or magnitude of motion is in reality much smaller, but the principle remains the same. FIG. 6 also serves to illustrate one of the aspects of the correction achieved by the optical image stabilization system of the present invention. As shown in FIG. 6, the lens 102 and motion sensor 104 undergo different amounts of movement due to the rotational movement. In other words, they are no longer optically aligned with the object being imaged. If the lens and sensor are co-located at the same position, or if the movement is purely translational, then the problem illustrated by FIG. 6 would not arise, since the sensor and lens would have the same displacement. Any movement change experienced by one would necessarily be experienced by the other since they are co-located at the same physical location. However, if they are not co-located, then they may each experience different amounts of movement, both in direction and magnitude. As a result, the movement measured by the sensor does not represent the movement of the lens, and thus the motion information provided by the sensor cannot be used directly for the OIS. If the motion information is used for the OIS, the stabilization is not correct, and it can lead to sub-optimal optimization, or even increase unwanted artifacts.

As shown in FIG. 6, to address this problem, the present invention also considers and takes into account the sensor-lens vector SLV 606, i.e., the vector between the sensor and lens, which indicates the relative position between the sensor and lens. This sensor-lens vector SLV 606 may be determined as part of the manufacturing or calibration process and stored in memory for future reference in connection with the correction procedure described herein. For example, as each camera unit is being manufactured, a test fixture or apparatus may be used to determine the lens position and/or sensor position, and thus the relative position between them. The particular value of this measurement, which may vary slightly from unit to unit, can then be stored in each individual camera unit for later use. According to the present invention, an estimated translation ET is determined which indicates the translation movement of the motion sensor 104. This estimated translation ET may be determined using information provided by the accelerometer or other suitable sensors 506. For example, estimated translation ET may be determined through double integration of the determined acceleration. When the sensor-lens vector SLV 606 is very small, or the rotational motion is very small, the estimated translation ET using the motion sensor is comparable to the motion of the lens, and thus the determined motion may be used for the OIS.

As shown in FIG. 6, if this estimated translation ET is added to the sensor-lens vector SLV 606 in an attempt to identify the position of the lens 102 after movement, then such a process will erroneously result in point 666 being identified as the lens position. In order to correct for the error in determining the motion of the lens, the present invention takes into account the rotation R which the device 101 has undergone, and the fact that the rotation may have resulted in differing amounts of position change for the lens and motion sensor. This rotation amount may be determined based on information provided by the gyroscope or other sensors 506 and is used by the processor 504 to determine a rotation correction RC. The rotation correction can then be combined with the estimated translation ET to determine the corrected translation CT, which represents the correct lens translation. In other words, the motion of the device as determined by the sensor is corrected using the sensor-lens vector SLV 606 and the measured rotation, to obtain the correctly determined motion of the lens. The correctly determined motion of the lens can then be used to control the actuators for the OIS.

Figure 7:
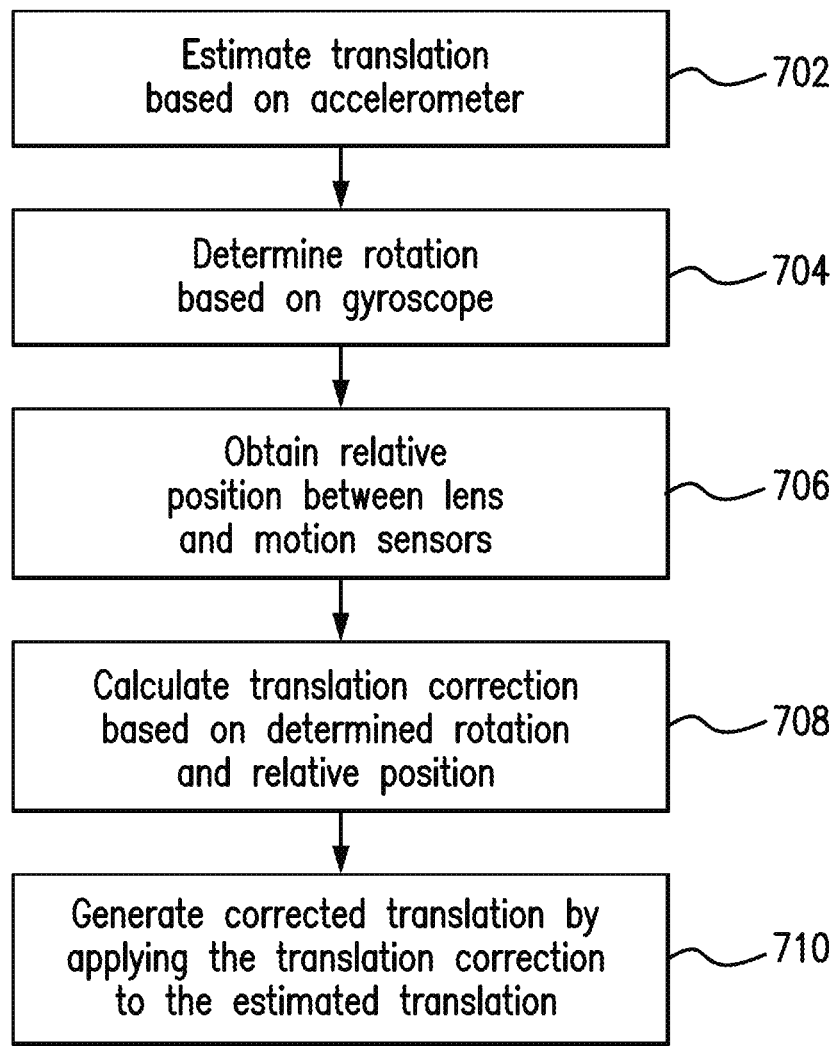
FIG. 7 is a flowchart illustrating a method of determining lens translation according to an embodiment of the present invention.

Referring now to FIG. 7 therein is illustrated the process flow carried out by embodiments of the present invention. First, at step 702, an estimate of translation undergone by the device is determined using a motion sensor. For example, an accelerometer may be used to determine the translation through double integration; however, the invention is not limited to using an accelerometer, but instead may use any suitable motion sensor. As discussed above, this estimate represents an estimate of the translation of the sensor, which may not be identical to the translation of the lens. Next, at step 704, a determination is made of the rotation undergone by the device using a motion sensor. For example, a gyroscope may be used to measure the angular velocity, which can then be integrated to determine an orientation change; however, the invention is not limited to using a gyroscope, but instead may use any suitable motion sensor. The accelerometer and gyroscope may use the same processor (MPU) to process the data, and may be incorporated in the same package or on the same chip. At step, 706, the relative position between the lens and motion sensors is obtained. The relative position may be read from memory and may have been provided during design of the device or may be obtained through a calibration procedure. This relative position between the motion sensor 604 and the lens 102 may also be referred to as the motion sensor/lens vector or motion sensor/lens vector signal which indicates the distance and direction from the motion sensor 604 to the lens 102. More details will be provided below in relation to FIG. 8. Continuing, at step 708, a correction to the estimated translation is determined based on the determined rotation of the device. As discussed in relation to FIG. 6, the correction is calculated by applying the determined rotation to the relative position vector, i.e. the sensor-lens vector SLC, or the motion sensor/lens vector. Finally, at step 710, the corrected translation CT is determined by applying to the estimated translation ET, the rotation correction RC. The corrected translation may then by used as an estimation of the lens translation to be used in the OIS. In other words, the actuators will correct the position of the lens for the motion defined by the corrected translation (vector).

As discussed above, in order to determine the correction, the relative position between the lens and the motion sensor(s) should be known. This relative position is referred to as the sensor-lens vector SLV or the motion sensor/lens vector or the motion sensor/lens vector signal. The relative position may be determined during the design phase of the device since it depends on the layout of the device. The relative position information may therefore be stored on the device as a (hardware) constant in any available memory that the processor calculating the correction can read. Should the relative position not be available, it can be determined during a calibration process. In the calibration process, the motion of the device can be determined by the motion sensors and through image analysis, and the relative position may be determined from a comparison of the motion sensor data and the image analysis data. The difference between the motion determined by the motion sensor and the motion derived from the image analysis can be attributed to the relative position difference. Determining motion from image analysis is well known in the art and will not be elaborated here. The principle is basically the inverse of the method described in relation to FIG. 6b. First determine the motion based on the sensors (ET) and the motion based on the image analysis (CT), and then determine the correction vector between these vector. The correction vector is then used to derive the relative position. The motion required for the calibration can be determined in advance and can be machine controlled in the factory, or the user can be asked to do a certain motion. Instruction may also be give as to the image subject and/or distance for optimal calibration. The calibration procedure may also be done opportunistically whenever the right conditions are detected (without the user knowing). The calibration may also be a multi-step process, where at first an estimate is preformed based on a first calibration step, and the estimate may be refined in subsequent steps. The quality of the image stabilization may also be determined using e.g. image analysis, and may be used as feedback during the calibration process. The calibration may also be preformed using a systematic sweep of possible sensor-lens vectors, starting with a small vector and varying the orientation, and then slowly increasing the magnitude of the relative position. For this method the quality of the image stabilization is determined, and then used as feedback to find the correct sensor-lens vector.

Figure 8:
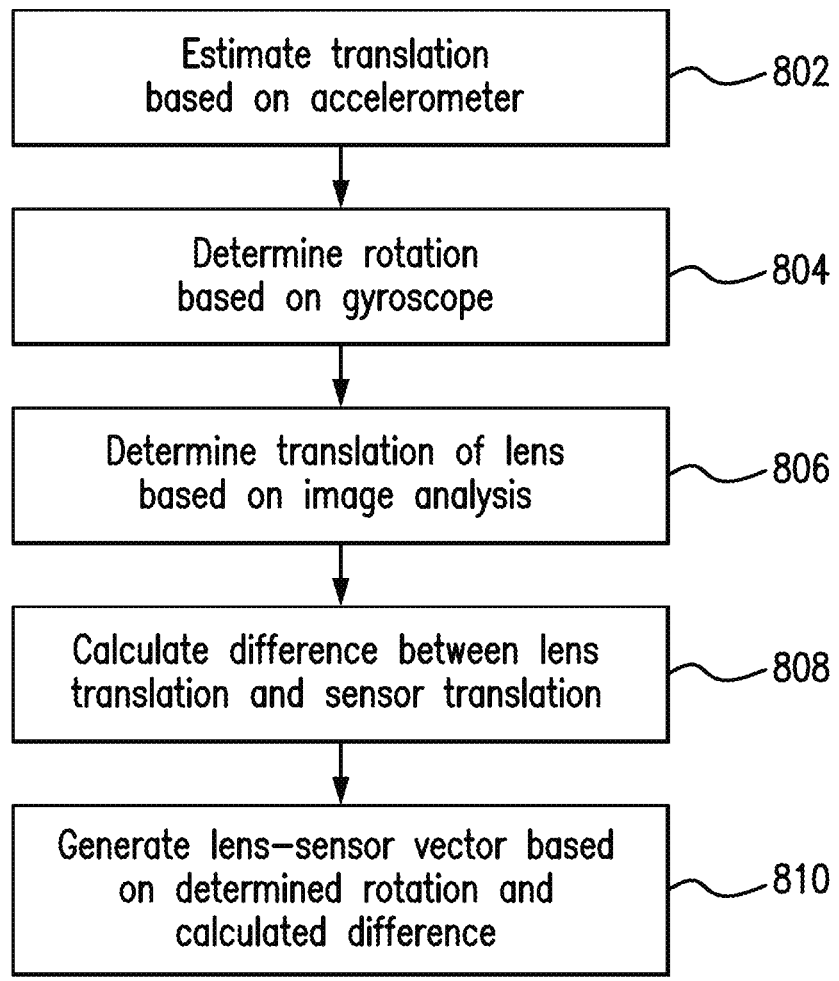
FIG. 8 is a flowchart illustrating a method of a lens sensor vector according to an embodiment of the present invention.

Referring now to FIG. 8 therein is illustrated an example process flow carried out by embodiments of the present invention for the calibration process. First, at step 802, an estimate of translation undergone by the device is determined using a motion sensor. For example, an accelerometer may be used to determine the translation through double integration. Next, at step 804, a determination is made of the rotation undergone by the device using a motion sensor. For example, a gyroscope may be used to measure the angular velocity, which can then be integrated to determine an orientation change. At step 806, an estimate of the translation of the device is determined based on the image analysis. Continuing, at step 808, the difference is determined between the translation determined by the motion sensors and the translation determined by the image analysis. This difference provides the desired correction for the relative position. Finally, at step 810, the relative position, i.e., sensor-lens vector, is determined based on the calculated difference in step 808 and the rotation determined in step 804. The sensor-lens vector is the vector where applying the determined rotation yields the calculated difference (as can be seen in FIG. 6).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed:

1. A method for optically stabilizing an image obtained using a camera unit, comprising the following steps:
    using a lens to obtain optical image information corresponding to an image;
    providing the optical image information to an image sensor to convert the optical image information into electrical image information;
    generating a rotation signal related to rotational movement of the camera unit using a first motion sensor capable of providing a signal related to rotation when the camera unit is rotated;
    generating a translation signal related to translational movement of the camera unit using a second motion sensor capable of providing a signal related to translation when the camera unit undergoes translational movement;
    modifying the translation signal using the rotation signal and a motion sensor/lens vector signal to generate a corrected translation signal representing movement of the lens, the motion sensor/lens vector signal indicating a relative position between the second motion sensor and the lens, wherein the corrected translation signal compensates for the movement of the lens which is different from movement of the second motion sensor indicated in the translation signal; and
    applying the corrected translation signal as input to control an actuator capable of adjusting a position of the lens with respect to the image sensor, based on rotation and translation experienced by the camera unit.

2. The method of claim 1, wherein the first motion sensor includes a first axis gyroscope capable of measuring angular velocity with respect to a first axis, and the step of generating a rotation signal includes generating a signal corresponding to angular velocity of the camera unit, the method further comprising the step of integrating the angular velocity to obtain the rotation signal.

3. The method of claim 2, wherein the second motion sensor includes a second axis accelerometer capable of measuring acceleration with respect to a second axis and a third axis accelerometer capable of measuring acceleration with respect to a third axis, with the first axis, second axis, and third axis being orthogonal to each other, and the step of generating the translation signal includes generating a signal corresponding to acceleration of the camera unit, the method further comprising the step of integrating the acceleration with respect to the second axis and the acceleration with respect to the third axis to obtain a translation with respect to the second and third axes.

4. The method of claim 1, wherein the relative position comprises a distance and a direction between the second motion sensor and the lens, and wherein the step of generating the corrected translation signal comprises the further steps of:
    utilizing the motion sensor/lens vector signal to indicate the distance and the direction between the second motion sensor and the lens to thereby determine a location of the lens with respect to the second motion sensor;
    generating a rotation correction signal by moving the motion sensor/lens vector signal by an amount corresponding to the rotation signal;
    utilizing the rotation correction signal in the step of modifying the translation signal to thereby generate the corrected translation signal.

5. The method of claim 4, wherein the step of generating the rotation correction signal further comprises the step of rotating the motion sensor/lens vector signal over an angle corresponding to the rotation signal to thereby generate the rotation correction signal.

6. The method of claim 4, wherein the motion sensor/lens vector signal is stored in a memory device of the camera unit.

7. The method of claim 4, wherein the motion sensor/lens vector signal is obtained using a calibration process.

8. The method of claim 7, wherein the motion sensor/lens vector signal is obtained by comparing motion determined by the first and second motion sensors, with motion determined using image analysis.

9. The method of claim 8, wherein the comparing further comprises:
    estimating translation of the camera unit based on signals from the second motion sensor;
    determining rotation of the camera unit based on signals from the first motion sensor;
    determining translation of the camera unit based on image analysis of images captured by the image sensor;
    determining a difference between the translation determined from the second motion sensor signals, and the translation determined from the image analysis; and
    generating the motion sensor/lens vector signal based on the determined rotation of the camera unit and the difference between the translation determined from the second motion sensor signals, and the translation determined from the image analysis.

10. The method of claim 1, wherein the step of adjusting the position of the lens with respect to the image sensor further comprises adjusting the position of one or both of the lens and the image sensor.

11. A device for optically stabilizing an image obtained using a camera unit, comprising:
    a lens positioned in the camera unit and capable of obtaining optical image information corresponding to an image;
    an image sensor positioned in the camera unit and in optical communication with the lens and capable of converting the optical image information into electrical image information;
    a first motion sensor positioned in the camera unit and capable of generating a signal related to rotational movement of the camera unit when the camera unit is rotated;
    a second motion sensor positioned in the camera unit and capable of generating a signal related to translational movement of the camera unit when the camera unit undergoes translational movement; and
    an actuator capable of adjusting a position between the lens and the image sensor based on a corrected translation signal representing movement of the lens, the corrected translation signal obtained from the signal related to translational movement and the signal related to rotational movement together with a motion sensor/lens vector signal to thereby adjust the position of the lens and image sensor based on rotation and translation experienced by the camera unit, the motion sensor/lens vector signal indicating a relative position between the second motion sensor and the lens, the corrected translation signal compensating for the movement of the lens which is different from movement of the second motion sensor indicated in the signal related to translational movement.

12. The device of claim 11, wherein the first motion sensor includes a gyroscope with at least one axis, the second motion sensor includes an accelerometer with at least two axes, and the at least one gyroscope axis and the at least two accelerometer axes are orthogonal.

13. The device of claim 11, wherein the first motion sensor and the second motion sensor are integrated in a single assembly.

14. The device of claim 11, wherein the first motion sensor and the second motion sensor are MEMS based motion sensors.

15. The device of claim 11, wherein the actuator capable of adjusting the position of the lens with respect to the image sensor is capable of adjusting the position of one or both of the lens and the image sensor.

16. The device of claim 11, further comprising a memory for storing the motion sensor/lens vector signal to indicate a distance and a direction between the second motion sensor and the lens to thereby determine a location of the lens with respect to the second motion sensor, and further comprising a processor capable of generating a rotation correction signal by moving the motion sensor/lens vector signal by an amount corresponding to the rotation signal and utilizing the rotation correction signal to modify the translation signal to thereby generate the corrected translation signal, wherein the relative position comprises the distance and the direction between the second motion sensor and the lens.

17. A system for optically stabilizing an image obtained using a camera unit, comprising:
a programmed processor;
a memory containing instructions, which when executed by the processor cause the processor to perform the following steps:
use a lens to obtain optical image information corresponding to an image;
provide the optical image information to an image sensor to convert the optical image information into electrical image information;
generate a signal related to rotational movement of the camera unit using a first motion sensor capable of providing a signal related to rotation when the camera unit is rotated;
generate a signal related to translational movement of the camera unit using a second motion sensor capable of providing a signal related to translation when the camera unit undergoes translational movement;
modify the signal related to translational movement of the camera unit using the signal related to rotational movement of the camera and a motion sensor/lens vector signal to generate a corrected translation signal representing movement of the lens, the motion sensor/lens vector signal indicating a relative position between the second motion sensor and the lens, wherein the corrected translation signal compensates for the movement of the lens which is different from movement of the second motion sensor indicated in the translation signal; and
apply the corrected translation signal as input to control an actuator capable of adjusting a position of the lens with respect to the image sensor based on rotation and translation experienced by the camera unit.

18. The system of claim 17, wherein the first motion sensor includes a gyroscope with at least one axis, the second motion sensor includes an accelerometer with at least two axes, and the at least one gyroscope axis and the at least two accelerometer axes are orthogonal.

19. The system of claim 17, wherein the first motion sensor and the second motion sensor are integrated in a single assembly.

20. The system of claim 17, wherein the first motion sensor and the second motion sensor are MEMS based motion sensors.

21. The system of claim 17, wherein the actuator capable of adjusting the position of the lens with respect to the image sensor is capable of adjusting the position of one or both of the lens and the image sensor.

22. The device of claim 17, further comprising a memory for storing the motion sensor/lens vector signal to indicate a distance and a direction between the second motion sensor and the lens to thereby determine a location of the lens with respect to the second motion sensor, and further comprising a processor capable of generating a rotation correction signal by moving the motion sensor/lens vector signal by an amount corresponding to the rotation signal and utilizing the rotation correction signal to modify the translation signal to thereby generate the corrected translation signal, wherein the relative position comprises the distance and the direction between the second motion sensor and the lens.

* * * * *